UNITED STATES PATENT OFFICE.

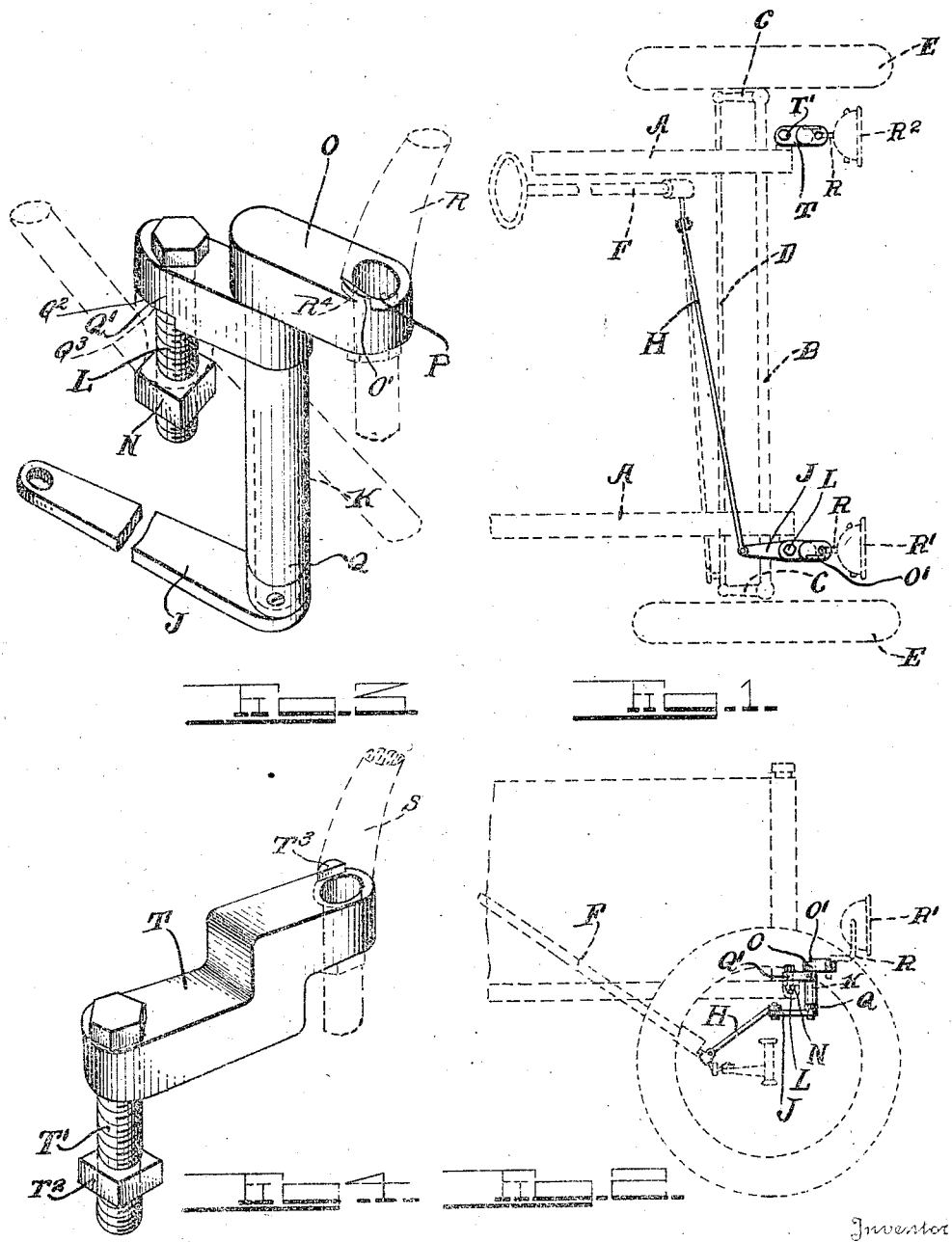

ERASMUS R. TRAMMELL, OF LAKELAND, FLORIDA.

DIRIGIBLE LIGHT.

1,178,359.  Specification of Letters Patent.  Patented Apr. 4, 1916.

Application filed May 4, 1915. Serial No. 25,783.

*To all whom it may concern:*

Be it known that I, ERASMUS R. TRAMMELL, a citizen of the United States, residing at Lakeland, in the county of Polk and State of Florida, have invented certain new and useful Improvements in Dirigible Lights; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dirigible lamps for automobiles and the object in view is to produce a simple and efficient apparatus of this nature so constructed and mounted as to reduce to a minimum the vibration incident to a vehicle moving over rough roads.

Another object of the invention consists in the provision of means whereby one lamp upon an automobile may be held stationary, while the other lamp is adapted to turn with the steering wheel and adapted to illuminate the track to be traversed by the wheels.

My invention is illustrated in the accompanying drawings, in which:

Figure 1 is a top plan view showing the application of the invention to the frame of an automobile. Fig. 2 is a side elevation of a portion of the automobile frame showing the dirigible light applied thereto. Fig. 3 is an enlarged detail perspective view of the invention. Fig. 4 is a detail perspective view of a lamp bracket.

Reference being had to the details of the drawings by letters, A designates the frame of an automobile, B the forward axle, C its stub axle connected therewith.

D designates a bar connecting the arms of the axle, causing the wheels E thereon to move together.

Steering-post F, shown in dotted lines, has pivotally connected thereto a rod H, which is pivoted to the crank arm J, the latter being fastened to the rod K, the upper end of which has a laterally extending projection O apertured as at P for the reception of the lower contracted and circumferential threaded portion of a lamp bracket member R which carries the lamp R'. Journaled upon said rod K is a cylindrical shell Q having a laterally extending portion Q' at its upper end and which is apertured for the reception of a bolt L upon which a threaded nut N is mounted. Said lateral projection Q' has a recess Q² formed in the lower edge thereof which is adapted to receive the usual lamp holding bracket Q³ upon the frame of the machine.

In Fig. 1 of the drawings, it will be noted that there are two lamps illustrated, only one of which is designed to move with the steering wheels through the medium of the steering mechanism, as described. The second lamp is designated by the letter R² and is stationary. In order to have the second lamp in the same vertical plane with the first-named lamp, a bracket arm T, shown in Fig. 4 of the drawings, is provided, and which is fastened by means of a bolt T' upon the bracket frame of the automobile, being held in place thereon by means of a nut T². Said bracket arm T has a lug T³ projecting therefrom and adapted to be engaged by a shoulder of the lamp bracket S to prevent the latter from swinging, the bracket arm S supporting said lamp R².

From the foregoing, it will be noted that when the steering wheels are swung in one direction or the other, the member Q' which is held stationary upon the frame of the automobile, will permit the rod K, which carries the bracket member O, to have an axial movement, thus swinging the lamp bracket R therewith, causing the rays of the lamp carried by the bracket R to shine upon the track to be traversed by the wheels of the automobile, and the rays of light from the second lamp R², which latter is held stationary upon the frame, will also be directed straight ahead of the machine.

What I claim to be new is:—

A dirigible lamp for automobiles comprising a bar having a recessed portion adapted to receive a lug upon the frame of an automobile and to which said bar is rigidly held, the bar provided with an integral downwardly projecting sleeve, a bracket member having a shank portion journaled in an aperture in said sleeve, a crank arm fixed to the lower end of said shank portion, said bracket member having a bearing aperture therein and a lug projecting upwardly from the marginal edges of said apertures and against which the bracket arm of a lamp is adapted to contact.

In testimony whereof I hereunto affix my signature, in presence of two witnesses.

ERASMUS R. TRAMMELL.

Witnesses:
  A. L. HOUGH,
  FRANKLIN H. HOUGH.